US012576389B2

(12) United States Patent
Imai et al.

(10) Patent No.: US 12,576,389 B2
(45) Date of Patent: Mar. 17, 2026

(54) FORMED ADSORBER FOR CANISTER

(71) Applicant: NIPPON PAPER INDUSTRIES CO., LTD., Tokyo (JP)

(72) Inventors: Daisuke Imai, Tokyo (JP); Yoshihide Watanabe, Tokyo (JP); Yu Takata, Tokyo (JP); Dongyeon Ryu, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 300 days.

(21) Appl. No.: 18/236,597

(22) Filed: Aug. 22, 2023

(65) Prior Publication Data

US 2023/0390737 A1 Dec. 7, 2023

Related U.S. Application Data

(63) Continuation of application No. PCT/JP2022/007256, filed on Feb. 22, 2022.

(30) Foreign Application Priority Data

Feb. 24, 2021 (JP) ................................. 2021-027989

(51) Int. Cl.
  B01D 53/04 (2006.01)
  B01J 20/20 (2006.01)
  (Continued)

(52) U.S. Cl.
  CPC .... B01J 20/28045 (2013.01); B01D 53/0415 (2013.01); B01J 20/20 (2013.01); (Continued)

(58) Field of Classification Search
  CPC . B01D 53/04; B01J 20/20; B01J 20/26; B01J 20/28; F02M 25/08
  See application file for complete search history.

(56) References Cited

U.S. PATENT DOCUMENTS 5,288,307 A 2/1994 Goltz et al.
5,310,593 A 5/1994 Tsujimoto et al.
  (Continued)

FOREIGN PATENT DOCUMENTS

CA 3 098 440 12/2019
CN 1815007 8/2006
  (Continued)

OTHER PUBLICATIONS

International Search Report issued May 10, 2022 in International (PCT) Application No. PCT/JP2022/007256.
  (Continued)

*Primary Examiner* — Sharon Pregler
(74) *Attorney, Agent, or Firm* — WENDEROTH, LIND & PONACK, L.L.P.

(57) ABSTRACT

An object is to provide a new form of formed adsorbers suitable for high performance canisters.
A formed adsorber for a canister is to satisfy the following conditions.
The formed adsorber satisfies a condition where $P_{0.2/100}$ expressed by Equation 1:

$$P_{0.2/100} = X \div Y \times 100 \qquad \text{(Equation 1)}$$

is 120% or less.
In Equation 1 above, X represents an amount of n-butane gas adsorbed per 100 parts by weight of the adsorbing material at 25° C. under an atmosphere where a gas pressure of n-butane gas is 0.2 kPa, and
Y represents an amount of n-butane gas adsorbed per 100 parts by weight of the adsorbing material at 25° C. under an atmosphere where a gas pressure of n-butane gas is 100 kPa.

13 Claims, 1 Drawing Sheet

(51) Int. Cl.
| | |
|---|---|
| *B01J 20/26* | (2006.01) |
| *B01J 20/28* | (2006.01) |
| *F02M 25/08* | (2006.01) |

(52) U.S. Cl.
CPC ....... *B01J 20/261* (2013.01); *B01J 20/28011* (2013.01); *B01J 20/2803* (2013.01); *B01J 20/28066* (2013.01); *B01J 20/28073* (2013.01); *B01J 20/28076* (2013.01); *B01J 20/2808* (2013.01); *B01J 20/28083* (2013.01); *F02M 25/0854* (2013.01); *B01D 2253/102* (2013.01); *B01D 2253/306* (2013.01); *B01D 2253/308* (2013.01); *B01D 2253/311* (2013.01); *B01D 2257/702* (2013.01); *B01D 2259/4516* (2013.01); *B01D 2259/4566* (2013.01)

(56) References Cited

U.S. PATENT DOCUMENTS

| | | | |
|---|---|---|---|
| 6,197,079 | B1 | 3/2001 | Mori et al. |
| 6,540,815 | B1 | 4/2003 | Hiltzik et al. |
| 7,051,717 | B2 | 5/2006 | Meiller et al. |
| 7,159,579 | B2 | 1/2007 | Meiller et al. |
| 7,442,232 | B2 | 10/2008 | White et al. |
| 7,467,620 | B1 | 12/2008 | Reddy |
| 7,737,083 | B2 | 6/2010 | Von Blücher et al. |
| 7,753,034 | B2 | 7/2010 | Hoke et al. |
| 7,763,104 | B2 | 7/2010 | Arruda et al. |
| 8,012,439 | B2 | 9/2011 | Arnold et al. |
| 8,372,184 | B2 | 2/2013 | Zimmermann |
| 9,541,043 | B2 | 1/2017 | Fedak et al. |
| 9,869,281 | B2 | 1/2018 | Cai et al. |
| 10,960,342 | B2 | 3/2021 | Hiltzik et al. |
| 11,807,525 | B2 * | 11/2023 | Imai .................. B01J 20/28038 |
| 2004/0182240 | A1 | 9/2004 | Bause et al. |
| 2005/0241479 | A1 | 11/2005 | Lebowitz |
| 2005/0241480 | A1 | 11/2005 | Lebowitz et al. |
| 2006/0141256 | A1 | 6/2006 | Ishikawa et al. |
| 2006/0205830 | A1 | 9/2006 | Lebowitz |
| 2006/0240980 | A1 | 10/2006 | Hung et al. |
| 2009/0038477 | A1 | 2/2009 | Abe et al. |
| 2009/0080142 | A1 | 3/2009 | Nanba et al. |
| 2010/0212496 | A1 | 8/2010 | Hanamoto et al. |
| 2014/0305309 | A1 | 10/2014 | McKenna et al. |
| 2015/0275727 | A1 | 10/2015 | Hiltzik et al. |
| 2017/0067415 | A1 | 3/2017 | Cai et al. |
| 2018/0363594 | A1 | 12/2018 | Byrne et al. |
| 2019/0186426 | A1 | 6/2019 | Nakagawa et al. |
| 2020/0368727 | A1 | 11/2020 | Schmitz et al. |
| 2021/0070617 | A1 | 3/2021 | Yamamoto et al. |
| 2021/0198111 | A1 | 7/2021 | Imai et al. |
| 2022/0152580 | A1 | 5/2022 | Imai et al. |
| 2022/0161182 | A1 | 5/2022 | Imai et al. |

FOREIGN PATENT DOCUMENTS

| | | |
|---|---|---|
| EP | 4 019 762 | 6/2022 |
| JP | 5-103979 | 4/1993 |
| JP | 07-251067 | 10/1995 |
| JP | 10-5580 | 1/1998 |
| JP | 2002-161440 | 6/2002 |
| JP | 2006-192333 | 7/2006 |
| JP | 2006-213544 | 8/2006 |
| JP | 2007-186403 | 7/2007 |
| JP | 4472636 | 3/2010 |
| JP | 2013-173137 | 9/2013 |
| JP | 2019-108880 | 7/2019 |
| JP | 6568328 | 8/2019 |
| JP | 2019-218943 | 12/2019 |
| KR | 10-2014-0098122 | 8/2014 |
| TW | 202005701 | 2/2020 |
| WO | 2004/099073 | 11/2004 |
| WO | 2006/022329 | 3/2006 |
| WO | 2019/115810 | 6/2019 |
| WO | 2019/131207 | 7/2019 |
| WO | 2021/033753 | 2/2021 |

OTHER PUBLICATIONS

Office Action issued Apr. 12, 2023 in Taiwanese Application No. 111106434 (with partial English translation).
Extended European Search Report issued Nov. 8, 2023 in European Patent Application No. 20855006.1.
International Preliminary Report on Patentability and Written Opinion of the International Searching Authority issued Feb. 17, 2022 in International (PCT) Application No. PCT/JP2020/031504.
English language translation of International Preliminary Report on Patentabilit issued Aug. 29, 2023 in International (PCT) Patent Application No. PCT/JP2022/007085.
International Search Report issued May 10, 2022 in International (PCT) Application No. PCT/IP2022/007085.
International Search Reported issued Oct. 27, 2020 in International (PCT) Application No. PCT/JP2020/031504.
Office Action issued Apr. 1, 2024 in U.S. Appl. No. 17/667,106.
Blaker, C. et al., "Investigation of load-dependent heat of adsorption of alkanes and alkenes on zeolites and activated carbon", Microporous and Mesoporous Materials, 2017, vol. 241, pp. 1-10, and Support information including Tables SI-S7, 37 pages in total.
Office Action issued Mar. 2, 2023 in Taiwanese Patent Application No. 111106432, with English language translation.
Written Opinion of the International Searching Authority issned Oct. 27, 2020 in International (PCT) Application No. PCT/JP2020/031504.
Notice of Reasons for Revocation issued Jan. 4, 2024 in Japanese Patent Application No. 2021-540982, with English language translation.
English language translation of Written Opinion issued May 10, 2022 in International (PCT) Patent Application No. PCT/JP2022/007085.
Office Action issued Apr. 15, 2021 in Taiwanese Application No. 109128123 with partial English translation.
English language translation of International Preliminary Report on Patetability issued Aug. 29, 2023 in corresponding International (PCT) Patent Application No. PCT/JP2022/007256.
Written Opinion issued May 10, 2022 in correpsonding International (PCT) Patent Application No. PCT/JP2022/007256, with English language translation.
Blaker, C. et al., "Investigation of load-dependent heat of adsorption of alkanes and alkenes on zeolites and activated carbon", Microporous and Mesoporous Materials, 2017, vol. 241, pp. 1-10, and Support Information including Tables S1- S7, 37 pages in total.
Abuko, H., "Effect of Average Diameter of Activated Carbon Granules on Estimation of Organic Vapor Breakthrough Time Using NIOSH MultiVapor™ Software and Discussion of Its Practical Use", Sangyo Eiseigaku Zasshi, published by the Japan Society for Occupational Health (JSOH), 2014, vol. 56, No. 6, pp. 275-285.
Baker, F.S. et al., "Carbon, Activated", 2013, vol. 4, pp. 741-761, Kirk-Othmer Encyclopedia of Chemical Technology, John Wiley & Sons.
Baker, F.S. et al., "Carbon, Activated", Abstract, 2003, Kirk-Othmer Encyclopedia of Chemical Technology, John Wiley & Sons.
Wigmans, T., "Industrial Aspects of Production and Use of Activated Carbons", Carbon, 1989, vol. 27, No. 1, pp. 13-22.
Notice of Reasons for Revocation issued Jan. 4, 2024 from Japanese Patent Office in corresponding Japanese Patent Application No. 2023-502441, with English language translation, 16 pages.
Notice of Allowance issued Aug. 14, 2024 in U.S. Appl. No. 17/667,106.
Extended European Search Report issued Nov. 19, 2024 in European Patent Application No. 22759607.9.
Extended European Search Report issued Nov. 5, 2024 in European Patent Application No. 22759652.5.

* cited by examiner

FORMED ADSORBER FOR CANISTER

CROSS-REFERENCE TO RELATED APPLICATIONS

This application is based upon and claims the benefits of priority(ies) from Japanese Patent Application No. 2021-027989, filed on Feb. 24, 2021; and International Application No. PCT/JP2022/007256, filed Feb. 22, 2022, the entire contents of which are incorporated herein by reference.

TECHNICAL FIELD

The present invention relates to a formed adsorber for canisters, and more particularly, to a formed adsorber for canisters, the formed adsorber using activated carbon.

BACKGROUND ART

Pressure in fuel tanks of vehicles changes as outside air temperature changes, for example, and fuel vapor that has filled the fuel tanks is released from the fuel tanks. These vehicles include motor vehicles, motorbikes (motorcycles), and boats, and have internal-combustion engines for combustion of fuel vapor, such as gasoline. The released fuel vapor is considered to be one of substances contributing to PM2.5 or photochemical smog. Canisters (also called fuel vapor restraining devices) including adsorbing materials, such as activated carbon, have been provided to prevent the release of the fuel vapor into the atmosphere.

With the recent increase in awareness for environmental conservation, various gas emission regulations tend to be tightened year by year and there is thus a demand for canisters to have higher adsorption performance. Furthermore, intake performance of motor vehicles tends to be reduced due to the spread of start-stop systems, for example, and gasoline adsorbed by adsorbing materials in their canisters thus tends to be difficult to be desorbed. Therefore, there is a demand for adsorbing materials used in canisters to have even higher performance. Activated carbon is often used as an adsorbing material to be used in canisters and granular activated carbon and activated carbon that has been molded into a pellet shape or a honeycomb shape have been proposed, for example (for example, Patent Literature 1.)

Furthermore, in recent years, for improvement of the performance of canisters, more canisters have an adsorbing material stored in more than one chamber by each being provided with a main chamber and an auxiliary chamber, for example (Patent Literature 2, for example).

Activated carbon fiber (or fibrous activated carbon) is sometimes referred to as the third activated carbon in contrast with conventional powdered or granular activated carbon. Among activated carbon in a broad sense, activated carbon fiber is said to: have micropores that are directly open at the outer surface of the activated carbon fiber; and have a tendency to be high in absorption and desorption speed. However, activated carbon fiber has not been put to practical use in canisters, and research and development have not advanced sufficiently as to characteristics of activated carbon fiber suitable for practical use in canisters.

An activated carbon fiber sheet having given characteristics has been proposed as one of adsorbing materials suitable for canisters (Patent Literature 3).

Furthermore, a formed activated carbon fiber adsorber has been proposed for improvement of mechanical strength and filling density of formed adsorbers using activated carbon fiber, the formed activated carbon fiber adsorber including:

activated carbon fiber and fibrillated cellulose fiber having resistance to alkali (for example, Patent Literature 4).

CITATION LIST

Patent Literature

Patent Literature 1: Japanese Patent Application Laid-open No. 2013-173137
Patent Literature 2: Japanese Patent Application Laid-open No. 2019-010880
Patent Literature 3: Japanese Patent No. 6568328
Patent Literature 4: Japanese Patent Application Laid-open No. H10-005580

SUMMARY OF INVENTION

Technical Problem

As described above, using activated carbon fiber as an adsorbing material for canisters has been attempted but activated carbon fiber is still under development for use as an adsorbing material for canisters. Furthermore, there has not been sufficient progress yet in research and development on what kind/kinds of adsorbing materials should be used when plural storage chambers including a main chamber and an auxiliary chamber are to be filled with an adsorbing material or adsorbing materials.

In view of the foregoing, one of objects to be solved by the present invention is to provide a new form of adsorbing materials suitable for high performance canisters.

Furthermore, another one of the objects to be solved by the present invention is to provide a formed adsorber that is a shaped product using activated carbon fiber, having improved mechanical strength, and having excellent effects of an adsorbing material for canisters.

Solution to Problem

As a result of diligent research, the inventers found that forming a formed adsorber by mixing activated carbon having given physical properties and a fibrous binder enables obtainment of a formed adsorber serving as a preferred adsorbing material for a high performance layer in a canister and the inventors completed the present invention. The present invention can be understood in various aspects and includes the following, for example, as solutions to problems.

[1] A formed adsorber for a canister, the formed adsorber comprising: $P_{0.2/100}$ of 18% or more, wherein
$P_{0.2/100}$ is expressed by Equation 1:

$$P_{0.2/100} = X \div Y \times 100 \qquad \text{(Equation 1)},$$

in Equation 1, X represents an amount of n-butane gas adsorbed (unit: parts by weight) per 100 parts by weight of the formed adsorber at 25° C. under an atmosphere where a gas pressure of n-butane gas is 0.2 kPa, and
Y represents an amount of n-butane gas adsorbed (unit: parts by weight) per 100 parts by weight of the formed adsorber at 25° C. under an atmosphere where a gas pressure of n-butane gas is 100 kPa.
[2] The formed adsorber according to [1] above, wherein $P_{0.2/100}$ is 21 or more.

[3] The formed adsorber according to [1] or [2] above, wherein $P_{100/50}$ of the formed adsorber is 120% or less, $P_{100/50}$ is expressed by Equation 2:

$$P_{100/50}=Y+Z\times100 \qquad \text{(Equation 2)}$$

is 120% or less, in Equation 2, Z represents an amount of n-butane gas adsorbed (unit: parts by weight) per 100 parts by weight of the formed adsorber at 25° C. under an atmosphere where a gas pressure of n-butane gas is 50 kPa, and Y is the same as Y in Equation 1.

[4] The formed adsorber according to [3] above, wherein $P_{100/50}$ is 115% or less.

[5] The formed adsorber according to [1] to [5] above, wherein the formed adsorber has a specific surface area of 2500 m²/g or less.

[6] The formed adsorber according to any one of [1] to [5] above, wherein the formed adsorber has a total pore volume ranging from 0.50 to 1.20 cm³.

[7] The formed adsorber according to any one of [1] to [6] above, wherein the formed adsorber has a mean pore size of 1.50 nm or more and 2.00 nm or less.

[8] The formed adsorber according to any one of [1] to [7] above, wherein the formed adsorber has a density ranging from 0.010 to 0.400 g/cm³.

[9] The formed adsorber according to any one of [1] to [8] above, wherein the formed adsorber includes activated carbon and a binder, and a ratio of a content of the binder to a content of the activated carbon is 0.3 to 20 parts by weight of the binder to 100 parts by weight of the activated carbon.

[10] The formed adsorber according to any one of [1] to [9] above, wherein the activated carbon includes activated carbon fiber.

[11] The formed adsorber according to any one of [1] to [10] above, wherein the formed adsorber is for a canister to be used in a motor vehicle.

[12] A canister comprising the formed adsorber according to any one of [1] to [11] above.

[13] The canister according to [12] above, wherein the canister is a canister for a motor vehicle.

Advantageous Effects of Invention

According to an aspect of the present invention, a formed adsorber is able to be provided, the formed adsorber having excellent adsorption-desorption performance and being suitable for high performance canisters or high performance layers of canisters.

According to another aspect of the present invention, a formed adsorber for canisters is able to be provided, the formed adsorber having excellent effects of an absorbing material for canisters, having improved mechanical strength, and being difficult to be deformed.

DESCRIPTION OF EMBODIMENTS

Figure 1:
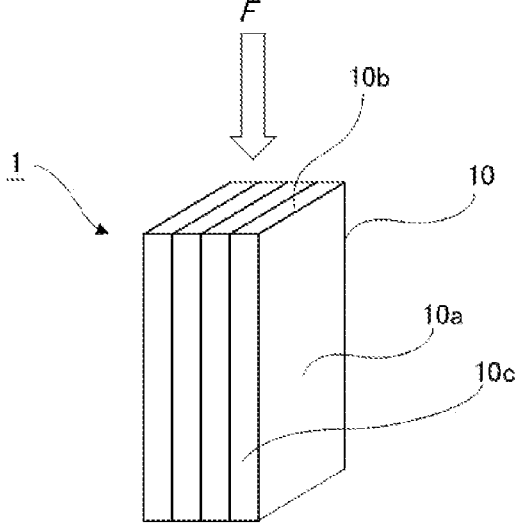
FIG. 1 is a diagram schematically illustrating an example of a layered adsorber having plural sheet-shaped adsorbers layered over one another and an example of a flow direction of fluid that passes through the layered adsorber.

As used herein, "a" or "an" may mean one or more. As used herein when used in conjunction with the word "comprising," the words "a" or "an" may mean one or more than one. As used herein "another" may mean at least a second or more. Furthermore, unless otherwise required by context, singular terms include pluralities and plural terms include the singular.

Embodiments of the present invention will be described hereinafter. The phrase, "ranging from AA to BB," related a numerical range means "being in the range of AA or more and BB or less," (where "AA" and "BB" represent any numerical values) unless otherwise specified. Furthermore, the units of the lower limit and the upper limit are the same as the unit written immediately after the upper limit (that is, "BB" herein), unless otherwise specified.

In the description of the present invention, both "adsorption" and "desorption" may be comprehensively referred to as "adsorption-desorption."

Furthermore, in the description of the present invention, the term "pore size" means the diameter or width of a pore, rather than the radius of the pore, unless otherwise specified clearly.

1. Formed Adsorber

A formed adsorber of the present invention is able to be used suitably for canisters. A canister is a piece of equipment that includes an adsorbing material and has a role in reducing vaporized fuel vapor released into the atmosphere by letting the vaporized fuel vapor be adsorbed by the adsorbing material and supplying fuel vapor to an engine by letting the fuel vapor adsorbed by the adsorbing material be desorbed when the engine is operating. Canisters are generally used in machines or equipment including internal-combustion engines that use fuels including highly volatile hydrocarbons, for example, in vehicles and vessels that include internal-combustion engines. Examples of these vehicles may include motor vehicles that use gasoline as a fuel. Examples of these vessels may include boats that use gasoline as a fuel.

In an embodiment of the present invention, the shape of the formed adsorber is not particularly limited, and for example, a preferred shape of the formed adsorber is able to be molded and allows gas to flow therethrough. Specific examples of the shape may include: a column shape having end faces that are circular or polygonal; a frustum shape, such as a truncated cone shape or a prismoid shape; a pellet shape; and a honeycomb shape, and preferably include cylinder shapes and cuboid shapes. Furthermore, plural disk-shaped, sheet-shaped, or plate-shaped adsorbers may be layered over one another to form a layered product.

PREFERRED EMBODIMENTS OF THE PRESENT INVENTION may satisfy a given condition related to an adsorbed amount ratio between different pressures expressed by Equation 1 or Equation 2 below. In the description related to the present invention, a ratio expressed by Equation 1 or 2, for example, and indicating a difference between adsorbed amounts under two atmospheres with different gas pressures is referred to as an adsorbed amount ratio between different pressures (unit:%). An adsorbed amount ratio between different pressures is able to be determined for a combination of various different pressures. In one embodiment, an adsorbed amount ratio between different pressures using an adsorbed amount under an atmosphere of 0.2 kPa and an adsorbed amount under an atmosphere of 100 kPa is expressed by Equation 1. In another embodiment, an adsorbed amount ratio between different pressures using an adsorbed amount under an atmosphere of 100 kPa and an adsorbed amount under an atmosphere of 50 kPa is expressed by Equation 2.

Adsorbed Amount Ratio Between Different Pressures Determined by Equation 1: $P_{0.2/100}$ In a preferred embodiment of the present invention, an adsorbed amount ratio between different pressures (%) expressed by Equation 1 below may be used as a first index.

$$P_{0.2/100}=X\div Y\times 100 \quad\quad\quad\quad \text{(Equation 1)}$$

In Equation 1, X represents an amount of n-butane gas adsorbed (unit: parts by weight) per 100 parts by weight of the activated carbon at 25° C. under an atmosphere where a gas pressure of n-butane gas is 0.2 kPa. Furthermore, in Equation 1, Y represents an amount of n-butane gas adsorbed (unit: parts by weight) per 100 parts by weight of the activated carbon at 25° C. under an atmosphere where a gas pressure of n-butane gas is 100 kPa.

In a preferred embodiment of the present invention, the lower limit of the adsorbed amount ratio between different pressures ($P_{0.2/100}$) expressed by Equation 1 may be preferably 18% or more, more preferably 193 or more, and even more preferably 20, 21, 22, 23, 24, or 25% or more.

The upper limit of the adsorbed amount ratio between different pressures ($P_{0.2/100}$) expressed by Equation 1 may be preferably 80%, more preferably 75%, and even more preferably 70, 65, or 60%.

Adsorbed Amount Ratio Between Different Pressures Determined by Equation 2: $P_{100/50}$ In a preferred embodiment of the present invention, an adsorbed amount ratio between different pressures (%) expressed by Equation 2 below may be used as a second index.

Equation 2:

$$P_{100/50}=Y\div Z\times 100 \quad\quad\quad\quad \text{(Equation 2)}$$

In Equation 2, Z represents an amount of n-butane gas adsorbed (unit: parts by weight) per 100 parts by weight of the activated carbon at 25° C. under an atmosphere where a gas pressure of n-butane gas is 50 kPa.

Furthermore, in Equation 2, Y is the same as Y in Equation 1 above. That is, in Equation 2, Y represents an amount of n-butane gas adsorbed (unit: parts by weight) per 100 parts by weight of the activated carbon at 25° C. under an atmosphere where a gas pressure of n-butane gas is 100 kPa.

The adsorbed amount ratio between different pressures ($P_{100/50}$) expressed by Equation 2 may be preferably 120% or less, more preferably 119, or less, and even more preferably 118, 117, 116, 115, 114, 112, 110, 108, or 106%.

In general, a canister is positioned between a fuel tank, an engine, and an opening for outside air, and gas moves in and out between them. Fuel that has evaporated from the fuel tank is caught by an adsorbing material in the canister. When a breakthrough of the capacity of the adsorbing material is reached, vapor is released to outside air through the opening for outside air from the canister. When the engine is operating, on the other hand, for example, vapor is sent from the adsorbing material to the engine due to a negative pressure. That is, the adsorbing material in the canister repeats adsorption and desorption of vapor.

In a canister having plural adsorption chambers, adsorbing materials having characteristics different from each other are preferably adopted for a main chamber (a first chamber) and an auxiliary chamber (a second or later chamber). There is a demand for the main chamber to catch and remove a large amount of highly concentrated vapor flowing in from the fuel tank, for example. That is, the main chamber is preferably large in adsorption capacity.

The auxiliary chamber where gas flows in from the main chamber, on the other hand, is desirably able to catch vapor that the main chamber has not been able to catch completely. That is, gas flowing in from the main chamber to the auxiliary chamber is relatively low in concentration of vapor and there is thus a demand for the adsorbing material in the auxiliary chamber to be high in performance for catching this vapor low in concentration. Therefore, the adsorbing material more preferably has, not only excellent adsorption capability, but also capability of easily allowing gas to be replaced upon purging of the adsorbing material in the canister.

That is, an adsorbing material for a canister, particularly, an adsorbing material desired to catch vapor low in concentration more preferably has, in addition to excellent adsorption capability, recovery performance for desorption up to a level where adsorption capability is sufficiently recovered. Accordingly, there is a demand for an adsorbing material higher in performance, particularly for the auxiliary chamber.

The inventors found that an adsorbing material having an adsorbed amount ratio between different pressures ($P_{0.2/100}$) expressed by Equation 1 of a given numerical value or more may achieve the above described high performance. The higher the index ($P_{0.2/100}$) of Equation 1 is, the higher the performance for adsorption of vapor is, even under an atmosphere low in pressure of gas, that is, under an atmosphere low in concentration of gas. Being high in adsorption performance under an atmosphere low in concentration means that the adsorbing material is suitable for a high performance layer of a canister.

Furthermore, the present inventors found that an adsorbing material having an adsorbed amount ratio between different pressures ($P_{100/50}$) expressed by Equation 2 of a given numerical value or less may achieve the above described high performance.

Adsorbed amount ratios between different pressures are able to be determined for various gas pressures but an adsorbed amount ratio between different pressures determined by Equation 2 is an index indicating, by means of a ratio, the difference between adsorbed amounts under an atmosphere where the pressure of gas is substantially maximum and under an atmosphere where the pressure of gas is half of that substantially maximum pressure (that is, under an atmosphere where the concentration of gas is about 50).

The adsorbed amount ratio between different pressures ($P_{100/50}$) determined by Equation 2 being 120% or less indicates that the adsorbed amounts do not largely differ between a case where the concentration of vapor is high and a case where the concentration of vapor is low. In other words, the adsorbed amount ratio between different pressures ($P_{100/50}$) being 120% or less means that dependence of the adsorption performance on concentration is low. An adsorbing material low in dependence on concentration as described above is an adsorbing material suitable for a high-performance layer of a canister, the adsorbing material being desired to catch vapor even at a low concentration.

Activated carbon for which adjustment of their pores is possible is preferably used in embodiments of the formed adsorber of the present invention, in terms of obtaining an adsorbing material having the above described preferred adsorbed amount ratio between different pressures. Among activated carbon, activated carbon fiber is preferably used because an adsorbing material low in dependence on concentration is easily obtained when activated carbon fiber is used.

Fulfilling at least one or any two or more of given items described below enables provision of more preferable embodiments of the formed adsorber of the present invention.

Specific Surface Area

The lower limit of specific surface area of the formed adsorber that may be used in the present invention may be preferably 100 $m^2/g$ or more, more preferably 200 $m^2/g$ or more, and even more preferably 300, 500, 700, 900, 1000, 1100, or 1200 $m^2/g$ or more.

The upper limit of specific surface area of the activated carbon that may be used in the present invention may be approximately 2500, 2400, 2300, 2200, or 2100 $m^2/g$ or less.

Setting the specific surface area in the above range enables the formed adsorber to have more excellent adsorption-desorption performance for fuel vapor. A formed adsorber including activated carbon fiber, for example, may be preferably adopted as the formed adsorber having such a specific surface area.

The lower limit of total pore volume of the formed adsorber that may be used in the present invention may be preferably 0.50 $cm^3/g$ or more, more preferably 0.55 $cm^3/g$ or more, and even more preferably 0.60, 0.65, 0.70, 0.75, 0.80, 0.85, or 0.90 $cm^3/g$ or more.

The upper limit of total pore volume of the formed adsorber that may be used in the present invention may be preferably 1.20 $cm^3/g$ or less, more preferably 1.15 $cm^3/g$ or less, and even more preferably 1.10, 1.05, 1.03, or 1.00 $cm^3/g$ or less.

Setting the total pore volume in the above range enables the formed adsorber to have more excellent adsorption-desorption performance for fuel vapor. A formed adsorber including activated carbon fiber, for example, may be preferably adopted as the formed adsorber having such a total pore volume.

Mean Pore Size (Mean Pore Diameter)

The lower limit of mean pore size of the formed adsorber that may be used in the present invention is preferably 1.50 nm or more, more preferably 1.60 nm or more, and even more preferably 1.70 nm or more.

The upper limit of mean pore size of the formed adsorber that may be used in the present invention may be optional but may be preferably 2.50 nm or less, more preferably 2.20 nm or less, and even more preferably 2.00 or 1.90 nm or less.

Setting the mean pore size in the above range enables the formed adsorber to have more excellent adsorption-desorption performance for fuel vapor. A formed adsorber including activated carbon fiber, for example, may be preferably adopted as the formed adsorber having such a mean pore size.

Ultramicropore Volume: $V_{0.7}$

With respect to the present invention, the term "ultramicropore" means a pore having a pore size of 0.7 nm or less.

The lower limit of ultramicropore volume of the formed adsorber that may be used in the present invention may be preferably 0.05 $cm^3/g$ or more, more preferably 0.10 $cm^3/g$ or more, and even more preferably 0.12 or 0.14 $cm^3/g$ or more.

The upper limit of ultramicropore volume of the formed adsorber that may be used in the present invention may be preferably 0.30 $cm^3/g$ or less, more preferably 0.29 $cm^3/g$ or less, and even more preferably 0.26, 0.24, 0.22, or 0.20 $cm^3/g$ or less.

Setting the ultramicropore volume in the above range enables the formed adsorber to have more excellent adsorption-desorption performance for fuel vapor. A formed adsorber including activated carbon fiber, for example, may be preferably adopted as the formed adsorber having such an ultramicropore volume.

Micropore Volume: $V_{2.0}$

With respect to the present invention, the term "micropore" means a pore having a pore size of 2.0 nm or less.

The lower limit of micropore volume of the formed adsorber that may be used in the present invention may be preferably 0.50 $cm^3/g$ or more, more preferably 0.60 $cm^3/g$ or more, and even more preferably 0.65 or 0.70 $cm^3/g$ or more.

The upper limit of micropore volume of the formed adsorber that may be used in the present invention may be preferably 1.00 $cm^3/g$ or less, more preferably 0.90 $cm^2/g$ or less, and even more preferably 0.80 $cm^3/g$ or less.

Setting the micropore volume in the above range enables the formed adsorber to have more excellent adsorption-desorption performance for fuel vapor. Activated carbon including activated carbon fiber, for example, may be preferably adopted as the activated carbon having such an ultramicropore volume.

Pore Volume of Pores Having Pore Size Larger than 0.7 nm and Equal to or Smaller than 2.0 nm: $V_{0.7-2.0}$ A pore volume $V_{0.7-2.0}$ of pores having pore sizes larger than 0.7 nm and equal to or smaller than 2.0 nm is able to be determined by Equation 3 below using a value "a" of ultramicropore volume and a value "b" of micropore volume.

$$V_{0.7-2.0}=b-a \tag{Equation 3}$$

The lower limit of pore volume $V_{0.7-2.0}$ of pores in the formed adsorber that may be used in the present invention, the pores having pore sizes larger than 0.7 nm and equal to or smaller than 2.0 nm, may be preferably 0.30 $cm^3/g$ or more, more preferably 0.36 $cm^3/g$ or more, and even more preferably 0.38, 0.40, or 0.50 $cm^3/g$ or more. The upper limit of pore volume $V_{0.7-2.0}$ of the pores in the formed adsorber that may be used in the present invention, the pores having pore sizes larger than 0.7 nm and equal to or smaller than 2.0 nm, may be preferably 1.00 $cm^3/g$ or less, more preferably 0.90 $cm^3/g$ or less, and even more preferably 0.80, 0.75, 0.70, 0.65, or 0.60 $cm^2/g$ or less.

Setting the pore volume $V_{0.7-2.0}$ in the above range enables the formed adsorber to have more excellent adsorption-desorption performance for fuel vapor. A formed adsorber including activated carbon fiber, for example, may be preferably adopted as the formed adsorber having such an ultramicropore volume.

Ratio of Volume of Ultramicropores to Volume of Micropores: $R_{0.7/2.00}>$

A ratio $R_{0.7/2.0}$ of the pore volume of ultramicropores having pore sizes of 0.7 nm or less to the pore volume of micropores having pore sizes of 2.0 nm or less is able to be determined by Equation 4 below using the value "a" of the ultramicropore volume and the value "b" of the micropore volume.

$$R_{0.7/2.0}=a/b \times 100(\%) \tag{Equation 4}$$

The lower limit of the ratio $R_{0.7/2.0}$ of the ultramicropore volume to the micropore volume in the formed adsorber that may be used in the present invention may be preferably 15.0% or more, more preferably 18% or more, and even more preferably 19% or more.

The upper limit of the ratio $R_{0.7/2.0}$ of the ultramicropore volume to the micropore volume in the formed adsorber that may be used in the present invention may be preferably 60% or less, more preferably 50% or less, and even more preferably 40, 30, or 25% or less.

Setting the ultramicropore volume ratio $R_{0.7/2.0}$ in the above range enables the formed adsorber to have more excellent adsorption-desorption performance for fuel vapor. A formed adsorber including activated carbon fiber, for example, may be preferably adopted as the formed adsorber having such an ultramicropore volume.

Basis Weight (Weight Per Unit Area)

In a case where the activated carbon serving as a material to be used in the formed adsorber of the present invention is activated carbon fiber, the activated carbon fiber in the form of a sheet preferably has a basis weight in the following range.

The lower limit of the basis weight may be preferably 50.0 g/m$^2$ or more, more preferably 60.0 g/m$^2$ or more, and even more preferably 70.0 or 80.0 g/m$^2$ or more.

The upper limit of the basis weight may be preferably 200 g/m$^2$ or less, more preferably 150 g/m$^2$ or less, and even more preferably 120, 110, or 100 g/m$^2$ or less.

Setting the basis weight in the above range enables manufacture of the formed adsorber having more excellent adsorption-desorption performance demanded for use in a canister within a range of volume of the adsorbing material that is able to be stored in the canister.

Dry Density

The lower limit and upper limit of dry density of a formed adsorber that is an embodiment of the present invention may be preferably as follows.

The lower limit of the dry density that may be used in the present invention may be preferably 0.010 g/cm$^3$ or more, more preferably 0.015 g/cm$^2$ or more, and even more preferably 0.020 g/cm$^3$, 0.030, 0.040, 0.050, or 0.060 g/cm$^3$ or more.

The upper limit of dry density of the activated carbon that may be used in the present invention may be preferably 0.400 g/cm$^3$ or less, more preferably 0.300 g/cm$^3$ or less, and even more preferably 0.200, 0.150, 0.140, 0.130, 0.120, 0.110, or 0.100 g/cm$^3$ or less.

Setting the dry density in the above range enables the formed adsorber to have more excellent adsorption-desorption performance per volume demanded for use in a canister within a range of the volume of the adsorbing material that is able to be stored in the canister. Furthermore, setting the dry density to the lower limit or higher prevents deterioration of the mechanical properties (for example, the strength) even if the formed adsorber has a sheet shape or a disk shape. Furthermore, the dry density of the formed adsorber is able to be adjusted by changing the fiber size of the carbon fiber, changing the fiber length by adjustment of stirring force at the time of defibrillating the carbon fiber, or changing the sucking force at the time of subjecting the mixed slurry containing the binder, such as a fibrous binder, to suction forming, and the pressure loss in the formed adsorber is thereby able to be reduced.

Moisture Content

The formed adsorber that may be used in the present invention preferably has a given moisture content. For example, the lower limit of moisture content at 23° C. and a relative humidity of 50% may be preferably 1 or more, more preferably 25 or more, and even more preferably 3, or more.

Furthermore, the upper limit of moisture content at 23° C. and a relative humidity of 50% may be preferably 30% or less, more preferably 25 or 20 or 15% or less, and even more preferably 10 or 8% or less.

Setting the moisture content in the above range under the above conditions enables the activated carbon to be more excellent as a formed adsorber for motor vehicle canisters. A formed adsorber including activated carbon fiber, for example, may be preferably adopted as the formed adsorber having such a moisture content.

Fiber Size of Activated Carbon Fiber

The lower limit of fiber size of activated carbon fiber that may be used in the formed adsorber of the present invention may be preferably 4.0 μm or more, more preferably 6.0 μm or more, and even more preferably 8.0, 10.0, 12.0, 14.0, 18.0, 19.0, or 20.0 μm or more.

The upper limit of the fiber size of the activated carbon fiber that may be used in the formed adsorber of the present invention may be optional in terms of reduction of pressure loss, but may be, for example, 60.0 μm or less, preferably 55.0 μm or less, and more preferably 50.0, 45.0, 40.0, or 35.0 μm, in consideration of balance between reduction of pressure loss and adsorption-desorption performance.

Setting the fiber size of the activated carbon fiber that may be used in the formed adsorber in the above range enables obtainment of a formed adsorber enabling more reduction of pressure loss.

Mean Value of Fiber Length of Activated Carbon Fiber

The lower limit of mean value of fiber length of the activated carbon fiber that may be used in the formed adsorber of the present invention may be preferably 300 or more, more preferably 500, 600, 700, 800, 850, 900, or more, and even more preferably 950 or more.

The upper limit of the mean value of the fiber length of the activated carbon fiber of the present invention may be preferably 5000 or less, more preferably 4000, 3000, 2500, 2000, 1500, or less, and even more preferably 1200 or less.

Setting the mean value of the fiber size of the activated carbon fiber that may be used in the formed adsorber in the above range enables obtainment of a formed adsorber enabling more reduction of pressure loss.

Coefficient of Variation of Fiber Length of Activated Carbon Fiber

The lower limit of coefficient of variation of fiber length of the activated carbon fiber that may be used in the formed adsorber of the present invention may be preferably 0.100 or more, more preferably 0.200, 0.300, 0.400, 0.500, or more, and even more preferably 0.600 or more.

The upper limit of the coefficient of variation of the fiber length of the activated carbon fiber that may be used in the formed adsorber of the present invention may be preferably 2.500 or less, more preferably 2.000, 1.500, 1.000, 0.900, 0.800 or less, and even more preferably 0.700 or less.

Setting the coefficient of variation of the fiber length of the activated carbon fiber that may be used in the formed adsorber in the above range enables obtainment of a formed adsorber enabling more reduction of pressure loss.

Fineness of Precursor of Activated Carbon Fiber

To obtain the activated carbon fiber having the fiber size as described above, a fiber size (fineness) of fiber serving as a precursor of the activated carbon fiber is preferably in the following range. That is, adopting the following fiber as the precursor may be said to be suitable for obtaining activated carbon fiber that enables reduction in pressure loss.

The lower limit of the fiber size (fineness) of the fiber serving as the precursor may be preferably 4.0 dtex or more, more preferably 5.0 dtex or more, and even more preferably 8.0, 10.0, 12.0, or 15.0 dtex or more.

The upper limit of the fiber size (fineness) of the fiber serving as the precursor may be preferably 60.0 dtex or less, more preferably 50.0 dtex or less, and even more preferably 40.0 or 30.0 dtex or less.

Mean Value of Particle Size of Granular Activated Carbon

The lower limit of mean value of particle size of granular activated carbon that may be used in the formed adsorber of the present invention may be preferably 100 or more, more preferably 150, 200, 250, 300, 350, 400, or more, and even more preferably 450 or more.

The upper limit of the mean value of the particle size of the granular activated carbon that may be used in the formed adsorber of the present invention may be preferably 3000 or less, more preferably 2500, 2000, 1500, 1000, 800, or less, and even more preferably 600 or less.

Setting the mean value of the particle size of the granular activated carbon that may be used in the formed adsorber in the above range enables obtainment of a formed adsorber enabling more reduction of pressure loss.

Coefficient of Variation of Particle Size of Granular Activated Carbon

The lower limit of coefficient of variation of the particle size of the granular activated carbon that may be used in the formed adsorber of the present invention may be preferably 0.01 or more, more preferably 0.025, 0.050, 0.075, 0.100, 0.125, 0.150 or more, and even more preferably 0.175 or more.

The upper limit of the coefficient of variation of the particle size of the granular activated carbon that may be used in the formed adsorber of the present invention may be preferably 2.500 or less, more preferably 2.000, 1.500, 1.000, 0.800, 0.600, 0.500, 0.400, 0.300 or less, and even more preferably 0.200 or less.

Setting the coefficient of variation of the particle size of the granular activated carbon that may be used in the formed adsorber in the above range enables obtainment of a formed adsorber enabling more reduction of pressure loss.

N-Butane Adsorption-Desorption Performance

In some embodiments of the present invention, the formed adsorber preferably has given n-butane adsorption-desorption performance of an adsorbing material. The n-butane adsorption-desorption performance serves as an index of adsorption-desorption performance for vapor and adsorbing materials having excellent n-butane adsorption-desorption performance are thus suitable for use in motor vehicle canisters. The n-butane adsorption-desorption performance can be expressed as an effective adsorption amount ratio for n-butane, which is determined as an amount of adsorbed n-butane per formed adsorber when adsorption is repeated after desorption of n-butane from the adsorbing material under given desorption conditions after sufficient absorption breakthrough of n-butane in the adsorbing material.

In a preferred embodiment of the formed adsorber of the present invention, the effective adsorption-desorption amount ratio for n-butane determined by a measurement method described with respect to Examples below may be preferably 6.00% by weight or more, more preferably 6.25% by weight or more, and even more preferably 6.50, 6.75, or 7.00% by weight or more.

Furthermore, in a preferred embodiment of the formed adsorber, the effective adsorption-desorption ratio for n-butane determined by a measurement method described with respect to Examples below may be preferably 25.0% or more, more preferably 30.0% or more, and even more preferably 40.0, 50.0, 60.0, 70.0, or 75.0% or more.

A formed adsorber including activated carbon fiber, for example, may be preferably adopted as the formed adsorber having such n-butane adsorption performance.

0-Ppm Maintaining Time

In a preferred embodiment of the formed adsorber of the present invention, the 0-ppm maintaining time determined according to a measurement method described with respect to Examples below may be preferably 15 minutes or 30 minutes or more, more preferably 40 minutes or more, and even more preferably 50 minutes, 55 minutes, 60 minutes, 65 minutes, 68 minutes, 69 minutes, or 70 minutes or more.

Longer 0-ppm maintaining time means the longer it takes for the adsorbing material to start releasing the adsorbed substance. Therefore, the 0-ppm maintaining time serves as an index of the adsorptivity.

A formed adsorber including activated carbon and a binder is an example of embodiments of the present invention. Including, not only activated carbon, but also a binder in the shaping enables: improvement in the mechanical strength; and obtainment of a formed product that is difficult to be deformed.

As long as various characteristics described in detail below are satisfied, the form of activated carbon that may be used in the present invention is not particularly limited. Examples of the activated carbon may include powdered activated carbon, granular activated carbon, and activated carbon fiber. One kind of activated carbon may be used or two or more kinds of activated carbon may be mixed and used as the activated carbon to be mixed in the formed adsorber. Furthermore, in a case where plural kinds of activated carbon are to be used, the ratio between the plural kinds of activated carbon to be included may be changed as appropriate. For example, a mixture of 5 to 100 parts by weight of activated carbon fiber and 0 to 95 parts by weight of powdered activated carbon may be used as the activated carbon.

In an embodiment of the present invention, a binder is used as a component of the formed adsorber. The binder that may be used is preferably a binder that does not block pores of activated carbon fiber and activated carbon. Examples of its material may include polyvinyl alcohol solutions. Furthermore, preferred examples of the binder may include fibrous binders. The binder may be a wet thermal adhesion type binder such as a fibrous polyvinyl alcohol binder. In addition, composite fiber, such as core-sheath fiber, side by side fiber, or radially divided fiber, may be used. Specifically, examples of the composite fiber may include: a combination of polypropylene (core) and polyethylene (sheath); a combination of polypropylene (core) and ethylene vinyl alcohol (sheath); a combination of high-melting-point polyester (core) and low-melting-point polyester (sheath); and a combination of high-melting-point polyester (core) and polyethylene (sheath). Furthermore, fully melting fiber including only polyethylene or polypropylene may be used. In addition, a fibrous binder that has been fibrillated may be used. Fibrillation is not particularly limited and any fibrillation enabling activated carbon fiber and granular activated carbon to be entangled and shaped may be used. A wide range of binders including synthetic binders and naturally occurring binders are able to be used. Examples of the fibrillated fibrous binder may include acrylic fiber, polyethylene fiber, polypropylene fiber, polyacrylonitrile fiber, cellulose fiber, nylon fiber, and aramid fiber.

The ratio of the content of the binder in the formed adsorber to the content of the activated carbon in the formed adsorber may be, for example, 0.3 to 20 parts by weight of the binder to 100 parts by weight of the activated carbon. The lower limit for the binder may be preferably 0.5 parts by weight, 0.8 parts by weight, 1.0 parts by weight, 2.0 parts by weight, or 3.0 parts by weight. Furthermore, the upper limit for the binder may be preferably 18 parts by weight, 15 parts by weight, or 10 parts by weight. Such a content ratio enables preparation of the formed adsorber so that both mechanical strength and adsorption-desorption performance of the formed adsorber are achieved. If higher mechanical strength is desired, the amount of the binder may be increased and if adsorption-desorption performance is considered to be important, the amount of the binder may be set low.

Mixing the binder at the above described content ratio enables prevention of degradation of characteristics, such as adsorption-desorption performance and pressure loss, due to obstruction of micropores of activated carbon fiber, and enables excellent characteristics of activated carbon fiber to be maintained and a formed adsorber excellent in these characteristics to be obtained.

As long as effects of the present invention are not nullified, the formed adsorber that is an embodiment of the present invention may include a component other than the activated carbon and the binder.

2. Shape of Formed Adsorber

Figure 2:
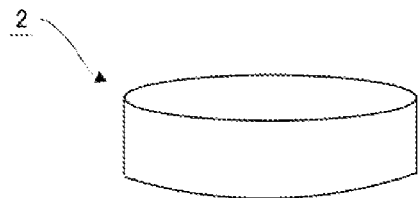
FIG. 2 is a diagram illustrating an example of an adsorber that has been formed in a disk shape.
Figure 3:
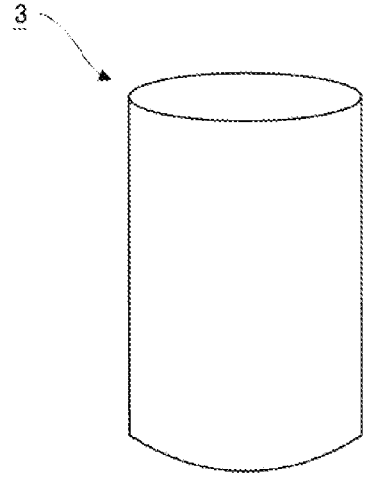
FIG. 3 is a diagram illustrating an example of an adsorber that has been formed in a cylinder shape.

The shape of the formed adsorber of the present invention is not particularly limited, and may be, for example, a disk shape, a column shape, a cylinder shape, a sheet shape, a plate shape, a pellet shape, or a honeycomb shape. Furthermore, plural disk-shaped, sheet-shaped, or plate-formed adsorbers may be layered over one another to form a layered product. FIG. 1 to FIG. 3 illustrate some embodiments. Dimensions, such as lengths and thicknesses, in the drawings have been schematically illustrated to allow the invention to be readily understood and are thus not limited to those illustrated in the drawings.

A layered adsorber 1 illustrated in FIG. 1 is a layered product formed of four formed adsorber sheets 10 superposed on one another. Major surfaces 10a of the sheet-formed adsorbers 10 are superposed on one another for the formation.

The layered adsorber 1 may be stored in a canister in any way. In a preferred embodiment, the layered adsorber 1 is preferably arranged so that the major surfaces 10a of the sheet-formed adsorbers are not orthogonal to the direction of flow of fluid F, such as vapor, and more preferably, as illustrated in FIG. 1, the layered adsorber 1 may be arranged so that the major surfaces a become approximately parallel to the direction of flow of the fluid F, such as vapor. Arranging the major surfaces a approximately parallel to the flow direction of the fluid F, such as vapor, places lateral end surfaces 10b of the plural sheet-shaped adsorbers to be against the flow direction of the fluid F. This arrangement enables reduction in pressure loss. In FIG. 1, the lateral end surfaces 10b shorter in length are against the flow direction of the fluid F, but without being limited to this arrangement, longer lateral end surfaces 10c may be arranged to be against the flow direction of the fluid F.

Furthermore, the overall shape of the layered adsorber may be cuboidal or cubical.

FIG. 2 illustrates another embodiment of the present invention. In the embodiment illustrated in FIG. 2, the formed adsorber has been shaped to be disk-shaped. Such disk-shaped adsorbers may be superposed on one another to form a cylindrical product.

FIG. 3 illustrates another embodiment of the present invention. In the embodiment illustrated in FIG. 3, the formed adsorber has been integrally shaped as a cylinder-shaped product.

The formed adsorber of the present invention is thus able to be processed or shaped in various shapes readily and is a material that is very easy to use.

3. Canister

The formed adsorber of the present invention is suitable as an adsorbing material to be stored in a motor vehicle canister. That is, the present invention also enables provision of a motor vehicle canister that is another embodiment.

The motor vehicle canister of the present invention has an adsorbing material placed therein, the adsorbing material being a formed adsorber. The motor vehicle canister has a structure that is not particularly limited, and may have any common structure. For example, the motor vehicle canister may be a motor vehicle canister having the following structure.

A canister comprising:

a housing;

an adsorbing material chamber to store an adsorbing material in the housing;

a first opening to connect between the adsorbing material chamber and an engine and allow gas to move between the adsorbing material chamber and the engine;

a second opening to connect between the adsorbing material chamber and a fuel tank and allow gas to move between the adsorbing material chamber and the fuel tank; and a third opening to open in response to application of a given pressure to the third opening from the adsorbing material chamber or from outside air, connect between the adsorbing material chamber and the outside air, and allow gas to move between the adsorbing material chamber and the outside air.

For a canister of the present invention, the above described formed adsorber of the present invention may be used as an adsorbing material. As described above, because the formed adsorber of the present invention enables reduction in pressure loss, even if the canister is fully filled with the formed adsorber, pressure loss is able to be reduced more than that in a case where a canister is filled with conventional activated carbon fiber sheets.

The first, second, and third openings are inlet-outlets through which gas is let in and let out. The arrangement of these openings that are inlet-outlets for gas is not particularly limited, but the third opening that is an inlet-output for outside air is preferably arranged at a position enabling gas to sufficiently pass through the adsorbing material when the gas moves between: the third opening; and the first opening and/or second opening. For example, in an embodiment that may be adopted, the first and second openings are provided on a first lateral surface of the housing and the third opening is provided on a second lateral surface located opposite to the first lateral surface.

The adsorbing material chamber may have more than one chamber. For example, the adsorbing material chamber may be divided into two or more sections by partition walls. The partition walls to be used may be porous plates having gas permeability. Furthermore, an additional adsorbing material chamber may be installed by provision of an external second housing separately from the first housing so that the first housing and the second housing are connected to each other via a gas passage. In a case where plural sections or housings are provided as described above, in a preferred embodiment, adsorbing materials or adsorbing material chambers may be arranged so that adsorption capacities in these sections or housings decrease sequentially from one section or housing to the next, from the first or second opening, into which gas from the engine or the fuel tank flows, toward the third opening.

Specific examples may include a composite canister including a main canister (a first housing) and a second canister (a second housing) that is additionally provided to the main canister and that is near the intake for outside air. When plural sections or housings are provided as described above, a high performance canister is able to be provided with reduced cost. Such a high performance canister has: a main body (a first section or a first housing) with the largest storage capacity; and a second or later section or housing with a relatively smaller storage capacity. The main body is a section or housing where vapor from the engine or fuel tank flows into first and conventional and inexpensive activated carbon is to be stored. The second or later section or housing is to store the formed adsorber of the present invention having excellent adsorption-desorption performance for a low concentration.

When there is more than one adsorbing material chamber, fuel vapor flowing, from a preceding layer, into an adsorbing material chamber positioned downstream from the engine or fuel tank (that is, the adsorbing material chamber positioned closer to the inlet-outlet for outside air) has become lower in concentration. Therefore, activated carbon having high n-butane adsorption performance for a low concentration of about 0.2% is suitable as an adsorbing material to be stored in a second section or second housing or a more downstream adsorbing material chamber. This second section or housing or the more downstream adsorbing material chamber is positioned downstream from the engine or fuel tank. Furthermore, use of the activated carbon in the adsorbing material chamber closer to the intake for outside air enables reduction in the amount of leakage of fuel vapor upon long-term stoppage of the motor vehicle because the effective amount of adsorption-desorption by the formed adsorber of the present invention through purging is large. In view of this effect also, the formed adsorber of the present invention is suitable as an adsorbing material to be used in a motor vehicle canister.

Therefore, a preferred embodiment of the canister may be, for example, as follows.

The canister is a canister for a motor vehicle and comprises a main chamber and an auxiliary chamber that each store an adsorbing material, the auxiliary chamber has a volume to store the adsorbing material, the volume being smaller than that of the main chamber, and the auxiliary chamber is arranged at a position closer to an opening connected to outside air than the main chamber is to the opening, and the adsorbing material of the present invention is stored in the auxiliary chamber.

In the above described embodiment, one main chamber and one auxiliary chamber may be provided, or two or more main chambers and two or more auxiliary chambers may be provided. In a case where three or more adsorbing material chambers are provided, the formed adsorber of the present invention may be stored in at least one adsorbing material chamber of the auxiliary chambers and may be preferably provided in the auxiliary chamber that is closest to the opening connected to the outside air.

4. Method of Manufacturing Formed Adsorber

The above described formed adsorber of the present invention is able to be obtained by forming activated carbon into a given shape. Examples of the activated carbon that may be used include activated carbon fulfilling a condition or conditions described above as preferred indices for the formed adsorber (for example, the indices expressed by Equation 1 and Equation 2).

In an embodiment of the above described formed adsorber of the present invention, the formed adsorber is able to be obtained by, for example, mixing activated carbon and a fibrous binder and shaping the mixed activated carbon and fibrous binder.

In a case where activated carbon fiber is used as the activated carbon, for example, the activated carbon fiber is able to be manufactured by carbonization and activation of fiber having a given fiber size. Any common methods may be adopted for the carbonization and activation.

Examples of embodiments for manufacturing the activated carbon fiber sheet using a precursor sheet (a raw material sheet) will be described below.

The activated carbon used in the present invention is not limited to the sheet shape. The activated carbon fiber sheet may be manufactured by using a precursor sheet (a raw material sheet) as described below, or powder of given activated carbon, for example, may be prepared.

4-1. Preparation of Raw Material Sheet (Precursor Fiber Sheet)

Type of Fiber

Examples of fiber forming the raw material sheet may include cellulosic fiber, pitch-based fiber, PAN-based fiber, and phenol resin-based fiber, and preferably include cellulosic fiber.

Cellulosic Fiber

The cellulosic fiber refers to fiber composed mainly of cellulose and/or a derivative thereof. Origins of cellulose and cellulose derivatives may be any one or more of examples including chemically synthesized products, plant derived cellulose, regenerated cellulose, and cellulose produced by bacteria. Examples of the cellulosic fiber that may be preferably used include: fiber formed of a plant cellulose material obtained from plants, such as trees; and fiber formed of a long fibrous regenerated cellulose material obtained by dissolution of a plant cellulose material (such as cotton or pulp) through chemical treatment. The fiber may contain a component or components, such as lignin and/or hemicellulose.

Examples of raw materials for the cellulosic fiber (the plant cellulose material or regenerated cellulose material) may include: plant cellulose fiber, such as cotton (such as short fiber cotton, medium fiber cotton, long fiber cotton, super long cotton, and ultra super long cotton), hemp, bamboo, kozo, mitsumata, banana, and tunicates; regenerated cellulose fiber, such as cuprammonium rayon, viscose rayon, polynosic rayon, and cellulose made from bamboo; purified cellulose fiber spun by use of organic solvent (N-methylmorpholine N-oxide); and acetate fiber, such as diacetate and triacetate. In terms of availability, at least one selected from cuprammonium rayon, viscose rayon, and purified cellulose fiber is preferable among these examples.

Filaments forming the cellulosic fiber preferably have sizes ranging from 5 to 75 µm and densities ranging from 1.4 to 1.9 m³/g.

The form of the cellulosic fiber is not particularly limited, and depending on the purpose, the cellulosic fiber prepared into a form of, for example, raw yarn (unprocessed yarn), false twisted yarn, dyed yarn, single yarn, folded yarn, or covering yarn, may be used. In a case where the cellulosic fiber includes two or more kinds of raw materials, the cellulosic fiber may be, for example, blended yarn or blended twisted yarn. Furthermore, the above-mentioned raw materials in various forms may be used alone or in combination of two or more, as the cellulosic fiber. Non-twisted yarn is preferred among the above-mentioned raw materials for both moldability and mechanical strength of the composite material.

Fiber Sheet

A fiber sheet refers to a sheet obtained by processing a large number of filaments of fiber into a thin and wide sheet. Fiber sheets include woven fabric, knitted fabric, and non-woven fabric.

Methods of weaving the cellulosic fiber are not particularly limited, and any common method may be used. Weaves of the woven fabric are not particularly limited either, and any of three foundation weaves, a plain weave, a twill weave, and a satin weave, may be used.

Spaces between warp yarns and between weft yarns of the cellulosic fiber in the woven fabric formed of the cellulosic fiber may range preferably from 0.1 to 0.8 mm, more preferably from 0.2 to 0.6 mm, and even more preferably from 0.25 to 0.5 mm. Furthermore, the woven fabric formed of the cellulosic fiber may have a mass per unit area ranging preferably from 50 to 500 g/m$^2$ and more preferably from 100 to 400 g/m$^2$.

Setting the spaces and the mass per unit area of the cellulosic fiber and the woven fabric formed of the cellulosic fiber in the above ranges enables carbon fiber woven fabric obtained by heat treatment of the woven fabric to have excellent strength.

Methods of manufacturing the nonwoven fabric are also not particularly limited. Examples of the methods may include: a method where a fiber sheet is obtained by use of a dry method or a wet method with the above-mentioned fiber serving as a raw material and having been cut into appropriate lengths; and a method where a fiber sheet is directly obtained from a solution using, for example, an electrospinning method. After the nonwoven fabric is obtained, treatment, such as resin bonding, thermal bonding, spun lacing, or needle punching, may be added for the purpose of bonding the filaments of fiber together.

4-2. Catalyst

In Embodiment 1 of a manufacturing method, a catalyst is held by the raw material sheet prepared as described above. The raw material sheet holding the catalyst is carbonized and further activated by using gas, such as water vapor, carbon dioxide, or air gas, and a porous activated carbon fiber sheet is thereby able to be obtained. Examples of the catalyst that may be used include a phosphoric acid-based catalyst and an organic sulfonic acid-based catalyst.

Phosphoric Acid-Based Catalyst

Examples of the phosphoric acid-based catalyst may include: oxyacids of phosphorus, such as phosphoric acid, metaphosphoric acid, pyrophosphoric acid, phosphorous acid, phosphonic acid, phosphonous acid, and phosphinic acid; ammonium dihydrogen phosphate, diammonium hydrogen phosphate, triammonium phosphate, dimethyl phosphono propanamide, ammonium polyphosphate, and polyphosphonitrile chloride; and condensation products between: phosphoric acid, tetrakis (hydroxymethyl) phosphonium salt, or tris (1-aziridinyl) phosphine oxide; and urea, thiourea, melamine, guanine, cyanamide, hydrazine, dicyandiamide, or a methylol derivative of any one of these. Preferable examples may include diammonium hydrogen phosphate. One kind of phosphoric acid-based catalysts may be used alone or two or more kinds of phosphoric acid-based catalysts may be used in combination. In a case where the phosphoric acid-based catalyst is used in the form of an aqueous solution, the phosphoric acid-based catalyst in the aqueous solution has a concentration ranging preferably from 0.05 to 2.0 mol/L and more preferably from 0.1 to 1.0 mol/L.

Organic Sulfonic Acid-Based Catalyst

An organic compound having one or more sulfo groups is able to be used as the organic sulfonic acid. For example, a compound in which a sulfo group is bonded to any of various carbon skeletons of aliphatic series or aromatic series is able to be used. A preferred organic sulfonic acid-based catalyst has a low molecular weight in terms of handling of the catalyst.

Examples of the organic sulfonic acid-based catalyst may include compounds represented by R—SO$_3$H where: R is a linear or branched alkyl group having 1 to 20 carbon atoms, a cycloalkyl group having 3 to 20 carbon atoms, or an aryl group having 6 to 20 carbon atoms; and each of the alkyl group, the cycloalkyl group and the aryl group optionally has a substituent of an alkyl group, a hydroxyl group, or a halogen group. Examples of the organic sulfonic acid-based catalyst may include methanesulfonic acid, ethanesulfonic acid, propanesulfonic acid, 1-hexanesulfonic acid, vinylsulfonic acid, cyclohexanesulfonic acid, p-toluene-sulfonic acid, p-phenolsulfonic acid, naphthalenesulfonic acid, benzenesulfonic acid, and camphorsulfonic acid. Methanesulfonic acid may be preferably used among these examples. Furthermore, one kind of these organic sulfonic acid-based catalysts may be used alone, or two or more kinds of these organic sulfonic acid-based catalysts may be used in combination.

In a case where the organic sulfonic acid is used in the form of an aqueous solution, the organic sulfonic acid in the aqueous solution has a concentration ranging preferably from 0.05 to 2.0 mol/L and more preferably from 0.1 to 1.0 mol/L.

Mixed Catalyst

The above-mentioned phosphoric acid-based catalyst and organic sulfonic acid-based catalyst may be mixed and used as a mixed catalyst. The mixing ratio may be adjusted as appropriate.

Holding of Catalyst

The catalyst is held by the raw material sheet. "Being held" means that the catalyst is kept in contact with the raw material sheet, and the catalyst may be held in any of various forms through, for example, adhesion, adsorption, or impregnation. Methods for the catalyst to be held by the raw material sheet are not particularly limited and may include, for example, a method of immersing the raw material sheet in an aqueous solution containing the catalyst, a method of sprinkling an aqueous solution containing the catalyst over the raw material sheet, a method of causing the raw material sheet to be in contact with vapor that is the catalyst that has been vaporized, and a method of mixing the fiber of the raw material sheet into an aqueous solution containing the catalyst to make paper.

A method that is able to be preferably used for sufficient carbonization is a method of immersing the raw material sheet in an aqueous solution containing the catalyst to impregnate the fiber with the catalyst such that the catalyst reaches the inside of the fiber. The temperature for the immersion in the aqueous solution containing the catalyst is not particularly limited and may be preferably room temperature. The immersion time ranges preferably from 10 seconds to 120 minutes and more preferably from 20 seconds to 30 minutes. The immersion allows the fiber forming the raw material sheet to adsorb, for example, 1 to 150% by mass and preferably 5 to 60% by mass, of the catalyst. After the immersion, the raw material sheet is preferably taken out from the aqueous solution and dried. A method of drying the raw material sheet may be, for example, any of methods including a method of leaving the raw material sheet to stand at room temperature or putting the raw material sheet in a dryer. The drying may be performed until the sample no longer changes in weight by evaporation of excess moisture after the sample is removed from the aqueous solution containing the catalyst. For example, in the drying at room temperature, the drying time over which the raw material sheet is left to stand may be 0.5 days or more. When the raw material sheet holding the catalyst almost no longer changes in mass through the drying, the step of carbonizing the raw material sheet holding the catalyst is performed.

4-3. Carbonization Treatment

After being prepared, the raw material sheet holding the catalyst is subjected to carbonization treatment. The carbonization treatment for obtaining the activated carbon fiber sheet may be performed according to a common method of carbonizing activated carbon. In preferred embodiments, the carbonization treatment may be performed as follows.

The carbonization treatment is usually performed under an inert gas atmosphere. According to the present invention, the inert gas atmosphere means an oxygen-free or low-oxygen atmosphere in which carbon is difficult to undergo a combustion reaction and is thus carbonized. The inert gas atmosphere may be preferably an atmosphere including gas, such as argon gas or nitrogen gas.

The raw material sheet holding the catalyst is subjected to heat treatment and carbonized in the given gas atmosphere mentioned above.

The lower limit of the heating temperature may be preferably 300° C. or higher, more preferably 350° C. or higher, and even more preferably 400° C. or higher or 750° C. or higher.

The upper limit of the heating temperature may be preferably 1400° C. or lower, more preferably 1300° C. or lower, and even more preferably 1200° C. or lower or 1000° C. or lower.

Setting the heating temperature as described above enables obtainment of a carbon fiber sheet with its fiber form maintained. If the heating temperature is lower than the above-mentioned lower limit, the carbon fiber may have a carbon content of 80% or less and carbonization thus tends to be insufficient.

The lower limit of the heat treatment time including the time for the temperature to rise may be preferably 10 minutes or more, more preferably 11 minutes or more, even more preferably 12 minutes, 15 minutes, 20 minutes, 25 minutes, or more, and still even more preferably 30 minutes or more.

The upper limit of the heat treatment time may be optional, but may be preferably 180 minutes or less, more preferably 160 minutes, and even more preferably 140 minutes or less.

Sufficiently impregnating the raw material sheet with the catalyst, setting the above-mentioned suitable heating temperature, and adjusting the heat treatment time enable adjustment of the degree of progress of pore formation and thus adjustment of the physical properties of the porous body, such as the specific surface area, the volumes of various pores, and the mean pore diameter.

If the heat treatment time is shorter than the above lower limit, carbonization tends to be insufficient.

Furthermore, the heat treatment may include further reheating treatment in a given gas atmosphere after the above described heat treatment (which may be referred to as primary heat treatment). That is, the carbonization treatment may be performed by dividing the heat treatment into two or more stages having different conditions, such as temperature conditions. Performing the primary heat treatment and the reheating treatment under given conditions may enable adjustment of the physical properties, promotion of the carbonization and the subsequent activation, and thus obtainment of an activated carbon fiber sheet having excellent adsorption-desorption performance.

4-4. Activation Treatment

Activation treatment according to the present invention may be, for example, performed continuously after the above described heat treatment, by providing water vapor or carbon dioxide and keeping an appropriate activation temperature for a given time, and enables obtainment of the activated carbon fiber sheet.

The lower limit of the activation temperature may be preferably 300° C. or higher, more preferably 350° C. or higher, and even more preferably 400, 500, 600, 700, or 750° C. or higher.

The upper limit of the activation temperature, on the other hand, may be preferably 1400° C. or lower, more preferably 1300° C. or lower, and even more preferably 1200 or 1000° C. or lower.

In a case where the activation treatment is performed continuously after the heat treatment, the activation temperature is preferably adjusted to a temperature that is almost the same as the heat treatment temperature.

The lower limit of the activation time may be preferably one minute or more, and more preferably five minutes or more.

The upper limit of the activation time may be optional, but may be preferably 180 minutes or less, more preferably 160 minutes or less, and even more preferably 140 minutes or less, 100 minutes or less, 50 minutes or less, or 30 minutes or less.

4-5. Manufacture of Formed Product

A method of manufacturing a formed product including activated carbon fiber and a fibrous binder is not particularly limited but the formed product is able to be obtained by, for example, preparing a mixture of the activated carbon fiber and the fibrous binder and shaping the mixture. In an embodiment, for example, the formed product is able to be manufactured as follows.

Preparation of Slurry Including Activated Carbon Fiber and Fibrous Binder

An activated carbon fiber sheet and a fibrous binder that have been prepared in advance are mixed into water, are mixed together through defibrillation and dispersion in a mixer, and slurry including both the activated carbon fiber sheet and the fibrous binder is thereby able to be obtained. The activated carbon fiber sheet to be put into the mixer may be put into the mixer after being made into small pieces having appropriate sizes, depending on the size of the mixer.

Formation of Shaped Product

The thus obtained slurry including the activated carbon fiber and the fibrous binder is poured into metal molds having desired shapes, moisture is removed from the poured slurry while the metal molds are being pressed, the molded slurry is thereafter dried, and a formed adsorber is thereby able to be obtained.

EXAMPLES

The present invention will hereinafter be described specifically by reference to Examples, but the technical scope of the present invention is not limited to Examples below.

Various items related to physical properties and performance of activated carbon fiber, granular activated carbon, and formed adsorbers were measured and evaluated by methods described below. Various numerical values defining the present invention can be determined by the following measurement methods and evaluation methods.

Specific Surface Area

About 30 mg of a measurement sample (an activated carbon fiber sheet, granular activated carbon, or a formed adsorber) were sampled, vacuum-dried at 200° C. for 20 hours, weighed, and measured using a high-precision gas/vapor adsorption amount measuring apparatus, BELSORP-MAX II (MicrotracBEL Corp.). The amount of nitrogen gas adsorbed at the boiling point of liquid nitrogen (77 K) was measured at a relative pressure ranging from the $10^{-8}$ order to 0.990, and an adsorption isotherm of the sample was thereby prepared. This adsorption isotherm was analyzed by the BET method for which the relative pressure range for analysis had been automatically determined under the conditions of the adsorption isotherm of Type I (ISO 9277), and the BET specific surface area per weight (unit: $m^2/g$) was determined as a specific surface area (unit: $m^2/g$).

Total Pore Volume

The total pore volume (unit: $cm^3/g$) by a one-point method was calculated on the basis of the result at the relative pressure of 0.960 on the adsorption isotherm obtained according to the above section related to the specific surface area.

Mean Pore Size (Mean Pore Diameter); Unit: nm

Calculation was performed using Equation 5 below.

$$\text{Mean pore diameter} = 4 \times \text{total pore volume} \times 10^3 \div \text{specific surface area} \qquad \text{(Equation 5)}$$

Ultramicropore Volume

The adsorption isotherm obtained according to the above section related to the specific surface area was analyzed using the analysis software BELMaster pertaining to the high-precision gas/vapor adsorption amount measuring apparatus, BELSORP-MAX II (MicrotracBEL Corp.) through the GCMC method with the analysis settings set as follows: "Smoothing (moving average processing using one point each before and after every analyzed point of the pore distribution)," "Distribution function: No-assumption," "Definition of pore size: Solid and Fluid Def. Pore Size," and "Kernel: Slit-C-Adsorption." The integrated pore volume at 0.7 nm was read from the obtained pore distribution curve for adsorption, the integrated pore volume serving as the ultramicropore volume (unit: $cm^3/g$).

Micropore Volume

The adsorption isotherm obtained according to the above section related to the specific surface area was analyzed using the analysis software, BELMaster, pertaining to the high-precision gas/vapor adsorption amount measuring apparatus, BELSORP-MAX II (MicrotracBEL Corp.), through the GCMC method with the analysis settings set as follows: "Smoothing (moving average processing using one point each before and after every analyzed point of the pore distribution)," "Distribution function: No-assumption," "Definition of pore size: Solid and Fluid Def. Pore Size," and "Kernel: Slit-C-Adsorption." The integrated pore volume at 2.0 nm was read from the obtained pore distribution curve for adsorption, the integrated pore volume serving as the micropore volume (unit: $cm^3/g$).

Basis Weight of Sheet

After the measurement sample (such as an activated carbon fiber sheet) was allowed to stand for 12 hours or more under the environment where the temperature was 23±2° C. and the relative humidity was 50±5%, the basis weight (unit: $g/m^2$) of the sheet was determined from the weight and the lengthwise and widthwise dimensions of the sheet.

Sheet Thickness

The measurement sample (such as an activated carbon fiber sheet) was allowed to stand for 12 hours or more under the environment where the temperature was 23±2° C. and the relative humidity was 50±5%, and the thickness (unit: mm) of the sheet was then measured using a small digital thickness measuring device, FS-60DS (Daiei Kagaku Seiki Mfg. Co., Ltd.), with a load of 0.3 kPa applied to the sheet.

Humidity Controlled Density of Sheet; Unit: $g/Cm^3$

Calculation was performed using Equation 6 below.

$$\text{Sheet density} = \text{basis weight of sheet} \div \text{sheet thickness} \div 10^3 \qquad \text{(Equation 6)}$$

Moisture in Sheet

The measurement sample (such as an activated carbon fiber sheet) was left to stand for 12 hours or more under the environment where the temperature was 23±2° C. and the relative humidity was 50±5%, 0.5 to 1.0 g of that measurement sample was thereafter collected as a sample and dried at 115±5° C. for three hours or more in a dryer, and moisture (unit: %) was determined from change in weight of the dried sample.

Measurement of Formed Adsorber

Sizes of the formed adsorber were measured using, for example, vernier calipers and a ruler. The dry weight of the formed adsorber was measured using an electrobalance.

Density of Formed Adsorber; Unit: $g/Cm^3$

Calculation was performed using Equation 7 below.

$$\text{Density} = \text{dry weight of formed adsorber} \div \text{volume of formed adsorber} \qquad \text{(Equation 7)}$$

The volume of the formed adsorber was calculated from results of the measurement of the formed adsorber.

N-Butane Adsorption-Desorption Performance

The concentration and flow rate of n-butane and the flow rate of air for desorption were independently set to perform tests by reference to Standard Test Method for Determination of Butane Working Capacity of Activated Carbon (ASTM D5228-16) of the American Society for Testing and Materials Standards.

The formed adsorber was dried at 115±5° C. for 3 hours or more in a dryer and the weight of the dried formed adsorber was measured after the dried formed adsorber was cooled. The mass of an empty adsorption container (a stainless-steel frame container that has the same cross-sectional shape as the formed adsorber and allows gas to flow therethrough) was measured and the adsorption container was then filled with the formed adsorber.

Subsequently, the test tube is placed in a flow apparatus and n-butane gas diluted with air to a concentration of 0.2% is fed into the test tube at 1.0 L/min at a test temperature of 25° C. to cause adsorption of n-butane. The test tube is removed from the flow apparatus and the mass of the test tube removed is measured. This feeding of the 0.2% n-butane gas was repeated until constant mass was achieved, that is, until the amount of adsorption was saturated.

The test tube was reinstalled into the flow apparatus and air was fed into the test tube at a test temperature of 25° C. for 12 minutes at 20.0 L/min to cause desorption of n-butane. The test tube was removed from the flow apparatus and the mass of the test tube removed was measured.

Measurement of 0-Ppm Maintaining Time

The change in concentration in adsorption and desorption upon the feeding of n-butane was measured, using a portable gas detector, Cosmotector (model number: XP-3160, manufacturer: New Cosmos Electric Co., Ltd.), every six seconds.

A time over which 0 ppm was maintained continuously from the beginning in second adsorption was determined as a 0-ppm maintaining time (minutes), the second adsorption being after first adsorption and first desorption. This 0 ppm was defined as change in concentration in the second adsorption, the change being less than the quantification lower limit (25 ppm).

These adsorption and desorption processes were repeated so as to be performed twice in total, and the first adsorption amount, the effective adsorption-desorption amount, the effective adsorption-desorption amount ratio, and the effective adsorption-desorption ratio were calculated using Equations 8, 9, 10, and 11 below.

$$\text{First adsorption amount=first amount of } n\text{-butane adsorbed} \qquad \text{Equation 8}$$

The unit of the numerical value is as follows.

First amount of n-butane adsorbed (unit: g)

$$\text{Effective adsorption-desorption amount=(second amount of } n\text{-butane adsorbed+second amount of } n\text{-butane desorbed})\div2 \qquad \text{Equation 9}$$

The units of the numerical values are as follows.

Effective adsorption-desorption amount (unit: g)

Second amount of n-butane adsorbed (unit: g)

Second amount of n-butane desorbed (unit: g)

$$\text{Effective adsorption-desorption amount ratio=effective adsorption-desorption amount}\div\text{dry weight of formed adsorber}\times100 \qquad \text{Equation 10}$$

The units of the numerical values are as follows.

Effective adsorption-desorption amount ratio (unit:% a by weight)

Effective adsorption-desorption amount (unit: g)

Dry weight of formed adsorber (unit: g)

$$\text{Effective adsorption-desorption ratio=effective adsorption-desorption amount}-\text{first adsorption amount}\times100 \qquad \text{Equation 11}$$

The units of the numerical values are as follows.

Effective adsorption-desorption ratio (unit: %)

Effective adsorption-desorption amount (unit: g)

First adsorption amount (unit: g)

Adsorbed Amounts at Different Pressures (unit: % by weight or g/100 g)

About 100 mg of an activated carbon fiber sheet, granular activated carbon, or a formed adsorber were sampled, vacuum-dried at 200° C. for 20 hours, weighed, and measured using a high-precision gas/vapor adsorption amount measuring apparatus, BELSORP-MAX II (MicrotracBEL Corp.). Amounts of n-butane gas adsorbed at 25° C. were measured at absolute pressures ranging from 0.1 to 105 kPa and an n-butane adsorption isotherm (unit: g) of the sample was prepared. This n-butane adsorption isotherm was divided by the dry weight (unit: g) of the sample and an n-butane adsorption isotherm (unit: 2 by weight) was thereby prepared. Amounts of n-butane gas adsorbed at 0.2 kPa, 0.5 kPa, 5 kPa, 50 kPa, and 100 kPa were read from this adsorption isotherm. Among these amounts of n-butane gas adsorbed, the amounts of n-butane gas adsorbed at 0.2 kPa, 100 kPa, and 50 kPa were respectively denoted by X, Y, and Z. They will be described as follows.

(1) X (unit: % by weight or g/100 g): amount (unit: g) of n-butane gas adsorbed per 100 g of the adsorbing material at 25° C. under an atmosphere where a gas pressure of n-butane gas was 0.2 kPa

(2) Y (unit: % by weight or g/100 g): amount (unit: g) of n-butane gas adsorbed per 100 g of the adsorbing material at 25° C. under an atmosphere where a gas pressure of n-butane gas was 100 kPa (3) Z (unit: % by weight or g/100 g): amount (unit: g) of n-butane gas adsorbed per 100 g of the adsorbing material at 25° C. under an atmosphere where a gas pressure of n-butane gas was 50 kPa Adsorbed Amount Ratio Between Different Pressures (Unit: %)

From the measured values X, Y, and Z obtained as described above, $P_{0.2/100}$ was calculated by Equation 1 and $P_{100/50}$ was calculated by Equation 2.

$$P_{0.2/100}=X\div Y\times100 \qquad \text{(Equation 1)}$$

$$P_{100/50}=Y\div Z\times100 \qquad \text{(Equation 2)}$$

Example 1

1.1 Activated Carbon Fiber Sheet

A needle-punched nonwoven fabric made of rayon fiber (17 dtex, a fiber length of 76 mm) and having a basis weight of 400 g/m$^2$ was impregnated with 6 to 10% diammonium hydrogen phosphate aqueous solution, wrung out, and dried, to have 8 to 10% by weight of diammonium hydrogen phosphate attached to the nonwoven fabric. The obtained pretreated nonwoven fabric was heated in a nitrogen atmosphere to 900° C. in 40 minutes and was kept at this temperature for three minutes. Continuously at that temperature, activation treatment was performed for 17 minutes in a nitrogen gas stream containing water vapor with a dew point of 71° C., thus obtaining an activated carbon fiber sheet.

1.2 Formed Adsorber

Into a mixer, 5 parts by weight (0.26 g) of a fibrous binder that was acrylic fiber 50TWF manufactured by Japan Exlan Co., Ltd., and 0.5 L of water were put, this mixture was subjected to defibrillation and dispersion for 30 seconds, subsequently, 100 parts by weight (5.10 g) of the activated carbon fiber sheet obtained as described in the above section 1.1 and 0.5 L of water were added to the mixture, the added mixture was subjected to further defibrillation and dispersion for ten seconds, and activated carbon fiber adsorption slurry was obtained. A metallic cylinder that is able to be divided at a position 18 mm from the bottom of the metallic cylinder and has an inner diameter of 63 mm and a height of 400 mm was placed on a funnel including a porous plate for suction dewatering, the adsorption slurry was poured into the metallic cylinder, and thereafter, suction dewatering was performed from the bottom for shaping. A bottom portion of the metallic cylinder was separated, the bottom portion being up to 18 mm from the bottom and containing the moist shaped product, the separated metallic cylinder was sandwiched between punching plates at upper and lower cross-sectional surfaces of the separated metallic cylinder, a one-kilogram weight was placed thereon, the shaped product was dried at 120° C. for four hours in a state of having been squashed to a height of 18 mm, the metallic cylinder was removed from the shaped product, and an adsorber that has been shaped into a disk shape having an outer diameter of 62 mm and a height of 18 mm was obtained. The obtained formed adsorber was more difficult to be deformed than the activated carbon fiber sheet.

Example 2

2.1 Activated Carbon Fiber Sheet

The same activated carbon fiber sheet as Example 1 above.

2.2 Formed Adsorber

Activated carbon fiber adsorption slurry was obtained similarly to Example 1, and granular activated carbon adsorption slurry was obtained with the activated carbon fiber sheet replaced with granular activated carbon (having a specific surface area of 1660 $m^2$/g, a mean particle size of 502 $\mu$m, and a standard deviation of 89 $\mu$m). Subsequently, 60 parts by weight (3.37 g) of the activated carbon fiber adsorption slurry and 40 parts by weight (2.25 g) of the granular activated carbon adsorption slurry were sampled and mixed together, and activated carbon fiber and granular activated carbon mixture adsorption slurry was thereby obtained. This adsorption slurry was subjected to suction dewatering by the same method as Example 1, dried, and a formed adsorber having an outer diameter of 62 mm, a height of 18 mm, and a disk shape was obtained. The obtained formed adsorber was more difficult to be deformed than the activated carbon fiber sheet.

Comparative Example 1

3.1 Activated Carbon Fiber Sheet

A needle-punched nonwoven fabric made of rayon fiber (17 dtex, a fiber length of 76 mm) and having a basis weight of 400 g/$m^2$ was impregnated with 6 to 10% diammonium hydrogen phosphate aqueous solution, wrung out, and dried, to have 8 to 101 by weight of diammonium hydrogen phosphate attached to the nonwoven fabric. The obtained pretreated nonwoven fabric was heated in a nitrogen atmosphere to 950° C. in 50 minutes and was kept at this temperature for four minutes. Continuously at that temperature, activation treatment was performed for 18 minutes in a nitrogen gas stream containing water vapor with a dew point of 71° C., thus obtaining an activated carbon fiber sheet.

3.2 Formed Adsorber

A formed adsorber was obtained by a manufacturing method similar to that of Example 1 above.

Comparative Example 2: Granular Activated Carbon

Granular activated carbon filling a commercially available canister was taken out and used as an adsorbing material of Comparative Example 2. The commercially available canister used was a canister having a product number of 14950-01FOA (Nissan Motor Co., Ltd.).

Comparative Example 3: Pelletized Activated Carbon

Granular activated carbon filling a commercially available canister was taken out and used as an adsorbing material of Comparative Example 3. The commercially available canister used was a canister having a product number of 1K0201801E (Volkswagen).

For each activated carbon for Examples 1 and 2 and Comparative Examples 1 to 3, values for the above described physical property items were measured according to the measurement methods described above. Results of the measurement are listed in Table 1. Furthermore, characteristics of the formed adsorbers of Examples 1 and 2 and Comparative Examples 1 to 3 are listed in Tables 2-1 and 2-2.

TABLE 1

Table 1: Characteristics of adsorbing materials

| | | | For Examples 1 and 2 ACF | For Example 2 Granular activated carbon | For Comparative Example 1 ACF | For Comparative Example 2 Granular activated carbon |
|---|---|---|---|---|---|---|
| Type of adsorbing material | | | | | | |
| Fineness of AGF precursor | | dtex | 17 | — | 17 | — |
| $N_2$ adsorption | Specific surface area | $m^2$/g | 1850 | 1660 | 2570 | 1460 |
| BET analysis | Total pore volume | $cm^3$/g | 0.82 | 0.77 | 1.29 | 1.05 |
| | Mean pore diameter | nm | 1.78 | 1.85 | 2.01 | 2.88 |
| $N_2$ adsorption | a) Ultramicropore volume[1] | $cm^3$/g | 0.22 | 0.13 | 0.15 | 0.13 |
| GCMC analysis | b) Micropore volume[2] | $cm^3$/g | 0.70 | 0.60 | 0.81 | 0.48 |
| | b) − a) | $cm^3$/g | 0.47 | 0.47 | 0.66 | 0.35 |
| | a)/b) | % | 32.1 | 22.3 | 17.9 | 26.2 |
| Physical properties of sheet | Basis weight | g/$m^2$ | 126.9 | — | 72.3 | — |
| | Thickness | mm | 3.17 | — | 2.49 | — |
| Humidity controlled density (at 23° C. and RH of 50%) | | g/$cm^3$ | 0.04 | 0.37 | 0.03 | 0.47 |
| Moisture (at 23° C. and RH of 50%) | | % | 4.7 | 10.7 | 1.8 | 27.5 |
| Adsorbed amount of n-butane | 0.2 KPa | wt % | 12.0 | 12.6 | 11.2 | 6.4 |
| at each pressure and 25° C. | 0.5 KPa | (g/100 g) | 16.5 | 17.1 | 16.9 | 10.0 |
| | 5 KPa | | 29.6 | 28.8 | 34.7 | 19.3 |
| | 50 KPa | | 39.8 | 38.4 | 57.7 | 30.8 |
| | 100 KPa | | 41.5 | 39.6 | 64.2 | 37.4 |
| Ratio between adsorbed amounts of n-butane at different pressures and 25° C. | 100 kPa ÷ 50 kPa | % | 104% | 103% | 111% | 122% |
| | 0.2 kPa ÷ 100 kPa | | 29% | 32% | 17% | 17% |

TABLE 1-continued

| Table 1: Characteristics of adsorbing materials | | | | |
|---|---|---|---|---|
| Type of adsorbing material Fineness of AGF precursor | | dtex | For Comparative Example 3 Pelletized activated carbon — | Reference standard Analysis method |
| N$_2$ adsorption BET analysis | Specific surface area | m$^2$/g | 1670 | JIS K 1477 Basic physical properties related to adsorption performance |
| | Total pore volume | cm$^3$/g | 0.88 | |
| | Mean pore diameter | nm | 2.10 | |
| N$_2$ adsorption GCMC analysis | a) Ultramicropore volume[1] | cm$^3$/g | 0.10 | Simulation analysis, Grand Canonical Monte Carlo method |
| | b) Micropore volume[2] | cm$^3$/g | 0.55 | |
| | b) − a) | cm$^3$/g | 0.45 | |
| | a)/b) | % | 17.9 | |
| Physical properties of sheet | Basis weight | g/m$^2$ | — | |
| | Thickness | mm | — | Measured with pressure of 0.3 kPa applied |
| Humidity controlled density (at 23° C. and RH of 50%) | | g/cm$^3$ | 0.45 | |
| Moisture (at 23° C. and RH of 50%) | | % | 22.2 | JIS K 1477 |
| Adsorbed amount of n-butane at each pressure and 25° C. | 0.2 KPa | wt % | 5.8 | |
| | 0.5 KPa | (g/100 g) | 8.7 | |
| | 5 KPa | | 20.9 | |
| | 50 KPa | | 37.5 | |
| | 100 KPa | | 42.1 | |
| Ratio between adsorbed amounts of n-butane at different pressures and 25° C. | 100 kPa + 50 kPa | % | 112% | |
| | 0.2 kPa + 100 kPa | | 14% | |

[1]Pore size of 0.7 nm or less

[2]Pore size of 2.0 nm or less

TABLE 2-1

| Table 2-1: Characteristics of shaped adsorbers | | | | Example 1 ACF | Example 2 ACF and granular activated carbon | Comparative Example 1 ACF | Comparative Example 2 Granular activated carbon |
|---|---|---|---|---|---|---|---|
| Mixing ratio | Activated carbon fiber | Parts per weight[2] | — | — | 100 | 60 | 100 |
| | Granular activated carbon | Parts per weight[2] | — | — | 0 | 40 | 0 |
| | Fibrous binder | Parts per weight[2] | — | — | 5 | 5 | 5 |
| N$_2$ adsorption BET analysis | Specific surface area | m$^2$/g | 1820 | 1760 | 2540 | Same as adsorbing material |
| | Total pore volume | cm$^3$/g | 0.82 | 0.80 | 1.26 | |
| | Mean pore diameter | nm | 1.78 | 1.82 | 2.02 | |
| N$_2$ adsorption GCMC analysis | a) Ultramicropore volume[1] | cm$^3$/g | 0.22 | 0.13 | 0.14 | |
| | b) Micropore volume[2] | cm$^3$/g | 0.69 | 0.63 | 0.79 | |
| | b) − a) | cm$^3$/g | 0.47 | 0.49 | 0.65 | |
| | a)/b) | % | 32.4 | 22.2 | 17.7 | |
| Adsorbed amount of n-butane at each pressure and 25° C. | 0.2 KPa | wt % | 10.8 | 12.1 | 10.7 | |
| | 0.5 KPa | (g/100 g) | 15.7 | 16.6 | 16.3 | |
| | 5 KPa | | 28.4 | 28.3 | 32.5 | |
| | 50 KPa | | 38.2 | 38.7 | 54.7 | |
| | 100 KPa | | 39.8 | 40.2 | 61.6 | |
| Ratio between adsorbed amounts of n-butane at different pressures and 25° C. | 100 kPa + 50 kPa | % | 104% | 104% | 113% | |
| | 0.2 kPa + 100 kPa | | 27% | 30% | 17% | |

| Type of shaped adsorber | | | | Comparative Example 3 Pelletized activated carbon | Reference standard Analysis method |
|---|---|---|---|---|---|
| Mixing ratio | Activated carbon fiber | Parts per weight[2] | — | — | |
| | Granular activated carbon | Parts per weight[2] | — | — | |
| | Fibrous binder | Parts per weight[2] | — | — | |
| N$_2$ adsorption BET analysis | Specific surface area | m$^2$/g | Same as adsorbing material | JIS K 1477 Basic physical properties related to adsorption performance |
| | Total pore volume | cm$^3$/g | | |
| | Mean pore diameter | nm | | |

TABLE 2-1-continued

| Table 2-1: Characteristics of shaped adsorbers | | | | |
|---|---|---|---|---|
| N₂ adsorption GCMC analysis | a) Ultramicropore volume[1] | cm³/g | | Simulation analysis. |
| | b) Micropore volume[2] | cm³/g | | Grand Canonical |
| | b) − a) | cm³/g | | Monte Carlo method |
| | a)/b) | % | | |
| Adsorbed amount of n-butane at each pressure and 25° C. | 0.2 KPa | wt % | | |
| | 0.5 KPa | (g/100 g) | | |
| | 5 KPa | | | |
| | 50 KPa | | | |
| | 100 KPa | | | |
| Ratio between adsorbed amounts of n-butane at different pressures and 25° C. | 100 kPa + 50 kPa / 0.2 kPa + 100 kPa | % | | |

[1]Pore size of 0.7 nm or less
[2]Pore size of 2.0 nm or less

TABLE 2-2

| Table 2-2: Characteristics of shaped adsorbers | | | Example 1 | Example 2 | Comparative Example 1 | Comparative Example 2 | Comparative Example 3 |
|---|---|---|---|---|---|---|---|
| | ACF fiber size | μm | 28.3 | 28.3 | 23.8 | — | — |
| ACF fiber length | Mean value | μm | 1008 | 1008 | 951 | — | — |
| | Standard deviation | μm | 671 | 671 | 375 | — | — |
| | Coefficient of variation[1] | — | | 0.67 | 0.67 | 0.39 | — | — |
| Particle size of granular activated carbon | Mean value | μm | — | 502 | — | 1960 | — |
| | Standard deviation | μm | — | 89 | — | 570 | — |
| | Coefficient of variation[1] | — | — | 0.18 | — | 0.29 | — |
| | Dry weight | g | 5.26 | 5.80 | 5.20 | 17.00 | 15.80 |
| Sizes | Cross-sectional diameter | cm | Φ6.2 | Φ6.2 | Φ6.2 | Φ6.2 | Φ6.2 |
| | Length | cm | 1.8 | 1.8 | 1.8 | 1.5 | 1.5 |
| | Volume | cm³ | 54.3 | 54.3 | 54.3 | 45.2 | 45.2 |
| | Dry density | g/cm³ | 0.097 | 0.106 | 0.095 | 0.34 | 0.35 |
| 0.2% n-butane adsorption and desorption performance | First adsorption amount | g | 0.53 | 0.63 | 0.46 | 0.92 | 0.79 |
| | Effective adsorption-desorption amount[2] | g | 0.43 | 0.47 | 0.31 | 0.54 | 0.45 |
| | Effective adsorption-desorption amount ratio[3] | wt % | 8.2 | 8.0 | 5.9 | 3.2 | 2.8 |
| | Effective adsorption-desorption ratio[4] | % | 81 | 75 | 64 | 59 | 57 |
| | 0-ppm Maintaining time[5] | min | 70 | 68 | 38 | 4 | 0 |

[1]Standard deviation/mean value
[2]Mean of second adsoprtion amount and second desoprtion amount
[3](Effective adsorption-desorption amount/weight of shaped adsorber) × 100 (%)
[4](Effective adsorption-desorption amount/first adsorption amount) × 100 (%)
[5]0-ppm maintaining time in second adsorption As indicated by the results for Examples 1 and 2 in Table 2-1, formed adsorbers having excellent adsorption-desorption performance were able to be manufactured using given activated carbon. Furthermore, the formed adsorbers of Examples 1 and 2 were found to have longer 0-ppm maintaining times than those of Comparative Examples 1 to 3.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

LIST OF REFERENCE SIGNS

1 LAYERED ADSORBER
10 SHEET-SHAPED ADSORBER
10a MAJOR SURFACE OF SHEET-SHAPED ADSORBER
10b LATERAL END SURFACE OF SHEET-SHAPED ADSORBER
10c LATERAL END SURFACE OF SHEET-SHAPED ADSORBER
F FLOW DIRECTION OF GAS
2 DISK-SHAPED ADSORBER
3 CYLINDER-SHAPED ADSORBER

What is claimed is:

1. A formed adsorber, comprising: activated carbon and a binder, wherein a content of the binder is 0.3 to 20 parts by weight relative to 100 parts by weight of the activated carbon, the formed adsorber has a $P_{0.2/100}$ of 18% or more, a $P_{100/50}$ of 120% or less, and an effective adsorption-desorption ratio for n-butane of 50% or more, wherein $P_{0.2/100}$ is expressed by Equation 1:

$$P_{0.2/100} = X \div Y \times 100 \qquad \text{(Equation 1), and}$$

$P_{100/50}$ is expressed by Equation 2:

$$P_{100/50} = Y \div Z \times 100 \qquad \text{(Equation 2),}$$

in Equation 1, X represents an amount of n-butane gas adsorbed (unit: parts by weight) per 100 parts by weight of the formed adsorber at 25° C. under an atmosphere where a gas pressure of n-butane gas is 0.2 kPa, and Y represents an amount of n-butane gas adsorbed (unit: parts by weight) per 100 parts by weight of the formed adsorber at 25° C. under an atmosphere where a gas pressure of n-butane gas is 100 kPa, in Equation 2, Z represents an amount of n-butane gas adsorbed (unit: parts by weight) per 100 parts by weight of the formed adsorber at 25° C. under an atmosphere where a gas pressure of n-butane gas is 50 kPa, and Y is the same as Y in Equation 1.

2. The formed adsorber according to claim 1, wherein $P_{0.2/100}$ is 21% or more.

3. The formed adsorber according to claim 1, wherein $P_{100/50}$ is 115% or less.

4. The formed adsorber according to claim 1, wherein the formed adsorber has a specific surface area of 2500 m²/g or less.

5. The formed adsorber according to claim 1, wherein the formed adsorber has a total pore volume ranging from 0.50 to 1.20 cm³.

6. The formed adsorber according to claim 1, wherein the formed adsorber has a mean pore size of 1.50 nm or more and 2.00 nm or less.

7. The formed adsorber according to claim 1, wherein the formed adsorber has a density ranging from 0.010 to 0.400 g/cm³.

8. The formed adsorber according to claim 1, wherein the activated carbon includes activated carbon fiber.

9. The formed adsorber according to claim 1, wherein the formed adsorber is used for a canister.

10. The formed adsorber according to claim 1, wherein the formed adsorber is to be stored in a canister.

11. The formed adsorber according to claim 1, wherein the formed adsorber is for a canister to be used in a motor vehicle.

12. A canister comprising the formed adsorber according to claim 1.

13. The canister according to claim 12, wherein the canister is a canister for a motor vehicle.

\* \* \* \* \*